TELEGRAPH TRANSMISSION CONTROL CIRCUITS

Filed March 17, 1954

INVENTORS
WILLIAM E. WALKER &
JAMES S. HARRIS
BY
Charles H. Brown
ATTORNEY 2,713,085
Patented July 12, 1955

2,713,085

TELEGRAPH TRANSMISSION CONTROL CIRCUITS

William Edward Walker, Brooklyn, N. Y., and James Stallings Harris, Old Greenwich, Conn., assignors to Radio Corporation of America, a corporation of Delaware Application March 17, 1954, Serial No. 416,814

11 Claims. (Cl. 178—69)

Figure 1:
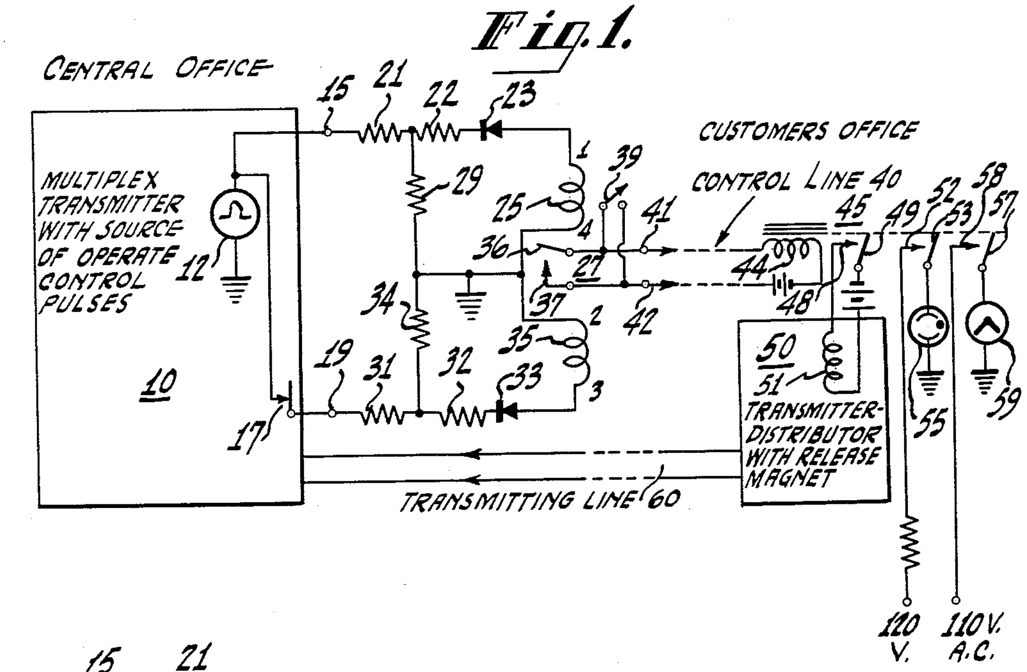

The invention relates to land-line telegraph transmission systems. It particularly pertains to automatic control of telegraph apparatus at a customer's office connected by a wire line to a central telegraph office for further transmission to another telegraph office, allowing transmissions from the customer's office to take place when the apparatus at the central office disposes of the messages and preventing transmissions for periods during which the apparatus at the central office is halted by adverse conditions of the transmitting medium between the central office and the other telegraph office.

The desired effect is obtained in connection with prior art transmitting systems by devious means. A control pulse generated in the central office is applied to the release magnet of a transmitter-distributor located in the customer's office. This pulse trips the release magnet in so-called relaxation control. For each pulse delivered to the transmitter-distributor one complete character is returned for utilization in the transmission system. Transmission is withheld under adverse conditions simply by withholding the control pulse. It is necessary to modify existing transmitter-distributors in order to accomplish control by this method. In the case of some types of transmitter-distributors such modification is highly impractical. Furthermore, when the transmitter-distributor is located at some distance from the protected transmitting circuit, problems of relaxation and phase timing of the transmitted characters relative to the operation of the transmitting circuits require circuit arrangements which are complex in character. Under certain circumstances, it is necessary to utilize a partial storage repetition device in order to make the system wholly operative.

Accordingly, it is an object of the invention to provide an improved telegraph transmission control circuit, which is adaptable to control any transmitter-distributor operating under magnet control.

Another object of the invention is to provide a telegraph transmission system in accordance with the foregoing object and in which partial or complete storage means of conventional form may be interposed without requiring the modification of any component.

A further object of the invention is to provide a circuit arrangement for controlling a timing device located remote from the transmitting equipment and at the same location as the message transmitter-distributor for indicating the time made available and favorable for transmission of messages.

In the system of the invention properly timed pulses are obtained from the inter-office transmitting equipment of a central telegraph office for synchronizing the operation of the equipment located at the central telegraph office and at the various customers' offices. Some of these synchronizing pulses are applied through circuitry which withholds or passes the pulses depending on the condition of the transmitting medium between the central telegraph office and another distant telegraph office. The pulses which are passed are called "controlled" pulses. Circuitry delivering such pulses is well-known in the art of telegraph signaling as "protected" circuitry. In accordance with the invention, these pulses are delivered to a control unit which interprets them and establishes corresponding conditions over a control line to the customer's office separate and apart from the transmitting line. In the customer's office the control line terminates in a response circuit which is coupled to the control or release magnet of the transmitter-distributor forming a part of the customer's office equipment. The response unit is arranged to interpret the conditions in the control line and supply or withhold energizing current from the control magnet of the transmitter-distributor. Thus, the transmitter-distributor is arranged to withhold transmission in the transmitting line when the protected transmitting equipment is interrupted and to resume transmission when the interruption ceases.

The circuitry of the control unit may be in a simple form wherein the uncontrolled synchronizing or operate pulses and the controlled pulses are applied to separate windings of a polar relay. Suitable limiting elements are arranged to make the value of the current delivered by the controlled pulses considerably greater than the current delivered by the operate pulses. Therefore, if both pulses are present at the same time, the controlled pulses will predominate to actuate the relay in the condition favorable to transmission.

When limited storage repeaters are used, the control unit is arranged to prevent the accumulation of extra characters in response to continuously repeated interruptions by delaying the restoration of transmission at the customer's office by a number of character intervals with respect to the resumption of transmission at the central office. Each character interval is represented by the time of occurrence of two successive synchronizing pulses. The control unit is further arranged so that one operate pulse is sufficient to open the control line but the presence of two controlled pulses are required to reclose the control line. Thus, the extra character delivered by the transmitter-distributor to the multiplex transmitter at the time of interruption is forwarded by the central office transmitting equipment before transmission from the customer's office is resumed.

Figure 2:
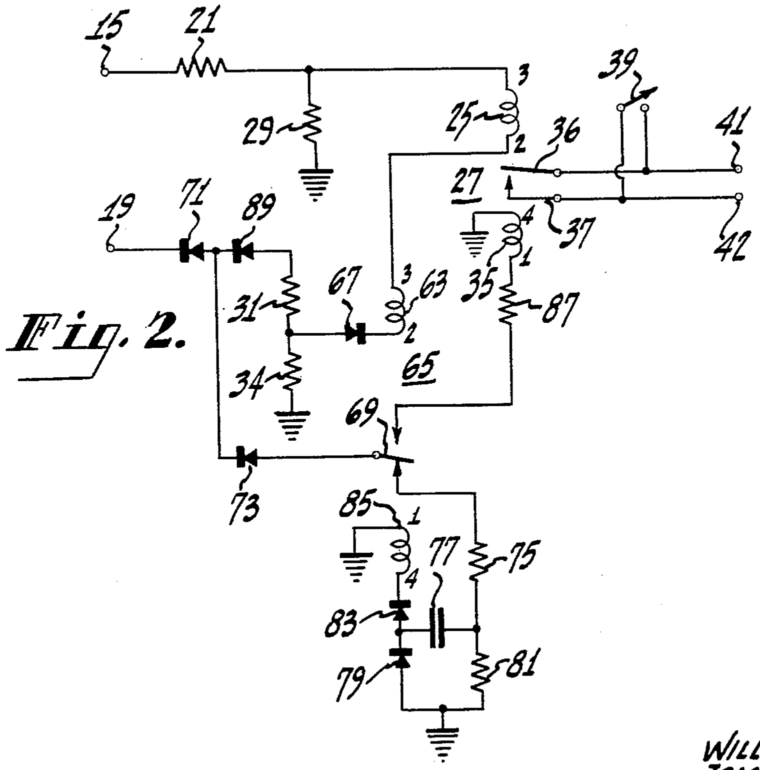

In order that the invention may be thoroughly understood and readily put in practical use, two circuit arrangements, given by way of example only, are described with reference to the accompanying drawing forming a part of the specification and in which:

Fig. 1 is a schematic diagram of the basic circuit arrangement according to the invention; and Fig. 2 is a schematic diagram of the control unit of an alternate embodiment according to the invention.

Referring to Fig. 1 there is shown the basic circuit arrangement according to the invention, wherein a protected multiplex telegraph transmitter 10 is located at a central telegraph office and arranged for transmitting messages originating at a remote customer's office to another distant telegraph office, either by wire telegraph line, or, as in most instances, over a radio telegraph transmission system. In the multiplex transmitter 10 the source of synchronizing pulses, shown here as a pulse generator 12, produces operate pulses at character rate between the terminal 15 and a point of neutral or fixed reference potential or ground. The multiplex transmitter 10 also provides controlled pulses which are delivered at character rate. A separate control pulse generator may be provided or, for the sake of simplicity, pulses from the synchronizing pulse generator 12 may be applied to the terminal 19 through contacts 17 which are closed during periods of conditions favorable for transmission from the central office to a distant central office (not shown) and which are open when conditions are adverse. Such multiplex transmitters are well-known in the art. One such example is to be found in the U. S. patents, 2,203,609 and 2,235,755, issued to A. Bakker and H. C. A. van Duuren on June 4, 1940, and March 18, 1941, respectively. Another such arrangement is shown and described in the copending U. S. patent application Ser. No. 379,859, filed on September 14, 1953, on behalf of Arthur E. Canfora. The pulse generator 12 may be in the form of a distributor face plate and rotating brush of mechanical telegraph apparatus, a connection to a relay type counting chain used as a timing wave generator, or a connection to an electronic tube circuit forming part of an electronic timing wave generator. All that is necessary is to obtain a pulse at character rate.

The uncontrolled synchronizing pulses appearing at the operate pulse input terminals 15—a ground connection being considered a part of the terminals—are applied through a pair of series-connected resistors 21, 22 and a diode element 23 to one winding 25 of a polar relay 27. A shunt resistor 29 forms a voltage dividing network in connection with the first series resistor 21 to reduce the voltage to a value which the diode 23 will safely handle. Obviously, rectifier types may be chosen to make such voltage division unnecessary. The controlled pulses appearing at the input terminal 19 are applied by way of a similar circuit comprising similarly connected resistors 31, 32 and 34 and another diode element 33 to another winding 35 of the polar relay 27. The values of the aforementioned resistors, especially those of resistors 22 and 32, are chosen so that the current flowing through the winding 35 is of greater magnitude than the current flowing through the winding 25. Preferably, the current through the winding 35 is made twice the value of the current flowing through the winding 25. The diodes 23 and 33 are placed in series with the windings of the polar relay 27 to pass the normally applied pulses of negative polarity and to block reactive positive pulses which might originate in the external circuits and which could cause mal-functioning of the polar relay 27. Current flowing through the winding 25 will open the contacts 36, 37 of the polar relay 27, while current flowing through the winding 35 will close the pair of contacts 36, 37 presenting a short-circuit across the control unit terminals 41, 42. A switch 39 is provided to open and close the control line manually if desired. If both controlled and uncontrolled synchronizing pulses are present, the former will predominate and the contacts 36, 37 of polar relay 27 will be closed.

When the contacts 36, 37 of the polar relay 27 are closed, current is delivered over the control line 40 to the winding 44 of a relay 45 in the response unit located at the customer's office. A pair of contacts 48, 49 on the relay 45 cause a current to flow through the transmitter-distributor release magnet 51 in response to closure of the contacts 36, 37 of the polar relay 27. Additional contacts 52, 53 apply a potential of 120 volts across a neon lamp 55 which indicates that the circuit is available for transmission when the neon lamp 55 is ignited. Further contacts 57, 58 are arranged to apply 110 volt alternating potential to an elapsed time indicator 59, which may be in the form of an ordinary electric clock or, if desired, one of the more elaborate elapsed time meters having automatic resetting means. Thus the application of current, or the withholding thereof, to the release magnet 51 of the transmitter-distributor 50 is made to conform to the delivery, or withholding, of the pulses generated by the transmitting circuits of the central office multiplex transmitter 10. The transmitter-distributor 50 is in condition for operation when the multiplex transmitter 10 is in condition to transmit a message to the distant station, and when the multiplex transmitter 10 is unable to clear traffic to the distant central office, the transmitter-distributor 50 in the customer's office is prevented from transmitting any messages. The arrangement shown in Fig. 1 is preferred for use with central office installations in which the transmitting line 60 terminates at the central telegraph office in a tape reperforator and transmitter-distributor combination for application to the multiplex transmitter 10.

Wherever possible, it is desired to eliminate the reperforator and transmitter-distributor combination in the multiplex transmitter 10. Without this combination, however, only partial storage, limited to a single character only, is available. The characteristics of the control line and the equipment associated therewith is often such as to make the interruption time at the transmitter distributor in the customer's office less than the interruption time in the central office multiplex transmitter 10, or the fact that the operation of the transmitter-distributor 50 is not held in strict phase alignment with that of the multiplex transmitter 10, may result in the transmission of a character which is not transmitted by the multiplex transmitter 10 when it is interrupted. Even with an arrangement having limited storage, intermittent but continuously repeated interruptions may deliver such additional characters beyond the limited capacity of partial storage or otherwise cause the loss of characters which the customer believes to have been transmitted, resulting in an erroneous message transmission. The arrangement shown in Fig. 2 is arranged to prevent the accumulation of such extra characters by delaying the restoration of transmission at the transmitter-distributor 50 one or more character intervals with respect to resumption of transmission at the multiplex transmitter 10. Under practically all conditions a single character interval delay time is sufficient. This character interval is represented by the time of occurrence of two successive synchronizing pulses.

Synchronizing operate pulses are applied to the operate pulse input terminals 15 of the arrangement shown in Fig. 2. When these operate pulses only are presented, they traverse the voltage divider comprising the resistors 21 and 29 and are presented to the spacing winding 25 of a polar relay 27 which is connected in series with the spacing winding 63 of another polar relay 65. They pass through a diode rectifier element 67 and the resistor 34 to a point of neutral fixed reference potential or ground. The current through these relay coils throws the armatures 36 and 69 to the spacing condition as shown in Fig. 2. Thus, when the uncontrolled synchronizing or operate pulses only are present both relays are immediately operated to the spacing condition. When the operate pulses are applied to the terminals 15 and the controlled pulses are applied to the terminals 19 the windings of the relays 27 and 65 are effectively in a bridge circuit comprised of the resistors 21, 29 and 31, 34. The potential at the junction of the resistors 31, 34 is of greater negative magnitude than that at the junction of the resistors 21, 29, and the diode 67 prevents current from flowing in the spacing windings 25 and 63 of the polar relays 27 and 65 respectively. Withholding of the controlled pulse from the terminal 19 causes the contacts of the polar relay 27 to open the circuit to the control line 40 immediately. When the interruption at the multiplex transmitter 10 ceases, the controlled pulse is restored to the terminal 19. The first controlled pulse traverses the diodes 71 and 73 and is applied through the resistor 75, through a storage element in the form of a capacitor 77, and through another diode 79 to a point of neutral fixed reference potential or ground, charging the capacitor 77. During the duration of this first pulse the applied potential holds the right hand side of the capacitor 77 to a negative potential. The left hand side of the capacitor 77 is rendered gradually decreasingly negative with respect to the point of fixed reference potential. When the pulse has ended, the potential at the right hand side of the capacitor 77 swings toward the reference potential through a resistor 81. The other side of the capacitor 77 becomes positive and the capacitor 77 then discharges through a diode 83 in series with the marking winding 85 of the polar relay 65, bringing the common contact or armature 69 of the relay 65 into the marking position. The second controlled pulse then traverses a resistor 87 and the mark winding 35 of the polar relay 27 to pole the armature 36 into contact with the contact 37, closing the control line at the terminals 41 and 42. In this manner, the circuit acts as a pulse counting arrangement. Diodes 73 and 89 are used to isolate the respective circuits one from the other. Thus the absence of one controlled pulse will open the control line 40 and the presence of two such pulses, having twice the amount of controlled pulse energy, are required in order to reclose the line. In this manner an extra character which has been delivered by the transmitter-distributor 50 to the multiplex transmitter 10 just prior to the time the transmitter 10 was interrupted is transmitted by the transmitter 10 after the interruption is over and just before the transmitter 50 resumes transmission.

By means of the circuit arrangements disclosed the operator in the customer's office is appraised, by means of indicator lamp 55, of the condition of the circuit between his office and the office with which he is corresponding. The elapsed time indicator 59 will inform the operator the period of time during which conditions were favorable for the transmission of messages from the customer's office to the ultimate destination. Normally, this is the time period on the basis of which charges for the service are based.

With the arrangement of Fig. 2 the operator also has the advantage of knowing that any character which has been transmitted by the transmitter-distributor 50 has been transmitted to the ultimate destination, except for perhaps the last character transmitted. In any event, the last character is transmitted upon the restoration of the circuit in service. This is an important factor in certain types of service such as stock market negotiations, commodity buying and selling, making of transportation arrangements and other arrangements of modern day business which must be made accurately and timely.

In working embodiments of the invention, constructed as shown in Figs. 1 and 2 which were tested on 42 6/7 baud rate signals, all rectifiers were type 1N63; all relays were Carpenter type 5A3 and the capacitor 77 had a value of 0.25 mfd., while the following values of resistors were used:

| Ref. No.: | | Value |
|---|---|---|
| **21** | kilohms | 10 |
| **22** | ohms | 470 |
| **29** | kilohms | 3.3 |
| **31** | do | 10 |
| **32** | ohms | 620 |
| **34** | kilohms | 3.3 |
| **75** | do | 2.2 |
| **81** | do | 10 |
| **87** | do | 22 |

Obviously, for other communication speeds, other values will be used by those skilled in the art.

The invention claimed is:

1. A telegraph transmission control circuit arrangement including a control relay having two windings and a pair of contacts connected to control line terminals, operate pulse input terminals and controlled pulse input terminals, a counting relay having two windings and a double throw contact structure having a common contact and two other contacts, a circuit comprising one winding of each relay and a diode element connected in series across said operate pulse terminals, another series circuit connected across said controlled pulse terminals through another diode element, the common contact of said counting relay and selectively through one other contact of said counting relay and the other winding of said control relay, and through a pair of series connected resistors, a capacitor connected to the junction between said pair of resistors, a further diode element connecting said capacitor through the other winding of said counting relay, and an additional diode element shunting said capacitor and one of said series connected resistors.

2. A telegraph transmission control circuit arrangement including a relay having two opposed windings and a pair of contacts connected to control line terminals, operate pulse input terminals and controlled pulse input terminals, a unidirectional circuit connected across said operate pulse terminals and comprising a voltage dividing network, and one winding of said relay and a rectifier element, another unidirectional circuit connected across said controlled pulse terminals and comprising a further voltage dividing network, another rectifier element, and the other winding of said relay, and means interposed in said circuit arrangement to apply more energy to the other winding of said relay than to the one winding to actuate said contacts to a predetermined condition only when energy is applied to said controlled pulse input terminals.

3. A telegraph transmission control circuit arrangement including a polar relay having two opposed windings and a pair of contacts connected to control line terminals, operate pulse input terminals and controlled pulse input terminals, a circuit connected across said operate pulse terminals and comprising two resistors and one winding of said polar relay connected in series and a shunt resistor connected between the junction of said two resistors and the end of said series circuit, a similar circuit connected across said controlled pulse terminals, the resistance elements of said circuits having values at which the current through one winding of said polar relay is greater than that through the other winding.

4. A telegraph transmission control circuit arrangement including a control polar relay having two opposed windings and a pair of contacts connected to control line terminals, operate pulse input terminals and controlled pulse input terminals, a counting polar relay having two opposed windings and a double throw contact structure having a common contact and two other contacts, a circuit comprising a series resistor, one winding of each polar relay, a diode element and another resistor connected in series across said operate pulse terminals, a shunt resistor connected to said series resistor and the terminal connected to said other resistor, another series circuit connected across said controlled pulse terminals through two other diode elements, the common contact of said counting polar relay and selectively through a resistor connected to one other contact of said counting polar relay and the other winding of said control polar relay, and through a pair of series connected resistors, a capacitor connected to the junction between said pair of resistors, a further diode element connecting said capacitor through the other winding of said counting polar relay, an additional diode element shunting said capacitor and one of said series connected resistors, and a diode element and a series resistor connected between the junction of the first said diode element and said other resistor and the junction of said two other diode elements.

5. In a telegraph transmission system comprising a multiplex transmitter at a central office and having means for producing operate pulses and for producing controlled pulses when said multiplex transmitter is operative with an ultimate receiver to transmit intelligence from a transmitter-distributor at a customer's office to said receiver, the combination of a transmitting telegraph line connected between said transmitter-distributor and said multiplex transmitter for transmitting intelligence from said transmitter-distributor to said multiplex transmitter, a control line connected at one end to means at said customer's office for enabling said transmitter-distributor in response to said controlled pulses produced by said multiplex transmitter and connected at the other end to a pair of contacts at said central office, a relay having two windings associated with said pair of contacts located at said central office, and means to apply said operate pulses to one of said windings and to apply said controlled pulses to the other of said windings.

6. In a telegraph transmission system comprising a multiplex transmitter at a central office having means for producing operate pulses when said multiplex transmitter is inoperative and for producing controlled pulses when said multiplex transmitter is operative with an ultimate receiver to transmit intelligence from a transmitter-distributor at a customer's office to said receiver, the combination of a transmitting telegraph line connected between said transmitter-distributor and said multiplex transmitter for transmitting intelligence from said transmitter-distributor to said multiplex transmitter, a release magnet at said customer's office for enabling said transmitter-distributor, energizing means serially connected to said release magnet, a control line connected at one end to said energizing means and to said release magnet, a polar relay having two opposed windings and a pair of contacts connected at said central office to the other end of said control line, means to apply said operate pulses to one of said windings to open said contacts, means to apply said controlled pulses to the other of said windings to close said contacts, and means to apply greater energy to said other winding to assure that said contacts close and that said transmitter-distributor is enabled.

7. In a telegraph transmission system comprising a multiplex transmitter at a central office having means for producing operate pulses when said multiplex transmitter is inoperative and for producing controlled pulses when said multiplex transmitter is operative with an ultimate receiver to transmit intelligence from a transmitter-distributor at a customer's office to said receiver, the combination of a transmitting telegraph line connected between said transmitter-distributor and said multiplex transmitter for transmitting intelligence from said transmitter-distributor to said multiplex transmitter, a release magnet at said customer's office for enabling said transmitter-distributor, energizing means serially connected to said release magnet, a control line connected at one end to said energizing means and said release magnet, a polar relay at said central office having two opposed windings and a pair of contacts connected to the other end of said control line, means to apply said operate pulses to one of said windings to open said contacts and disable said transmitter-distributor, means to apply said controlled pulses to the other of said windings to close said contacts and enable said transmitter-distributor, and means to render the current passing through said other winding of greater magnitude than the current passing through said one winding to assure that said contacts close and that said transmitter-distributor is enabled when said controlled pulses are applied to said other winding.

8. A telegraph system as defined in claim 7 wherein said means to render the current passing through said other winding of greater magnitude than the current passing through said one winding comprises a controlled pulse counting arrangement for allowing said current to flow in said other winding only in response to a plurality of said controlled pulses.

9. A telegraph system as defined in claim 8 wherein said counting arrangement comprises a second relay having two windings and a single pole double throw contact arranged to connect said other winding of said polar relay to said means to apply said controlled pulses in response to the first controlled pulse after an operate pulse, and to allow said current to flow in said other winding in response to succeeding controlled pulses.

10. In a telegraph transmission system comprising a multiplex transmitter at a central office having means for producing operate pulses when said multiplex transmitter is inoperative and for producing controlled pulses when said multiplex transmitter is operative with an ultimate receiver to transmit intelligence from a transmitter-distributor at a customer's office to said receiver, the combination of a transmitting telegraph line connected between said transmitter-distributor and said multiplex transmitter for transmitting intelligence from said transmitter-distributor to said multiplex transmitter, a release magnet at said customer's office for enabling said transmitter-distributor, energizing means serially connected to said release magnet, a control line connected at one end to said energizing means and said release magnet, a polar relay at said central office having two opposed windings and a pair of contacts connected to the other end of said control line, a first voltage dividing network connected between said multiplex transmitter and one of said windings to apply said operate pulses to said one winding so as to open said contacts and disable said transmitter-distributor, a second voltage dividing network connected between said multiplex transmitter and the other of said windings to apply said controlled pulses to said other winding so as to close said contacts and enable said transmitter-distributor, and means connected in each of said networks to apply twice as much energy to said other winding as to said one winding to assure that said contacts close and that said transmitter-distributor is enabled when said controlled pulses are applied to said second network.

11. A telegraph system comprising a central office and a remotely located customer's office, said central office having a multiplex transmitter adapted to relay messages from said customer's office to a remotely located receiver, said customer's office having telegraph apparatus, a telegraph line extending between said central office and said customer's office for passing messages from said telegraph apparatus at said customer's office to said central office, a control line between said central office and said customer's office for controlling the operation of said telegraph apparatus, a relay at said central office having a pair of windings and a pair of contacts connected across said control line, means at said central office for applying energy to one of said relay windings to energize said relay in one sense and close said contacts to thereby enable said telegraph apparatus at said customer's office, and means at said central office to apply energy to the other of said relay windings to energize said relay in an opposite sense and open said contacts to thereby disable said telegraph apparatus at said customer's office.

References Cited in the file of this patent

UNITED STATES PATENTS

| | | |
|---|---|---|
| 1,883,102 | Teter | Oct. 18, 1932 |
| 2,541,055 | Heaton-Armstrong | Feb. 13, 1951 |